(12) United States Patent
Mola et al.

(10) Patent No.: US 11,561,896 B2
(45) Date of Patent: Jan. 24, 2023

(54) CACHE-BASED TRACE LOGGING USING TAGS IN AN UPPER-LEVEL CACHE

(71) Applicant: Microsoft Technology Licensing, LLC, Redmond, WA (US)

(72) Inventors: Jordi Mola, Bellevue, WA (US); Thomas Philip Speier, Wake Forest, NC (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/229,645

(22) Filed: Apr. 13, 2021

(65) Prior Publication Data
US 2022/0269604 A1    Aug. 25, 2022

Related U.S. Application Data

(60) Provisional application No. 63/152,240, filed on Feb. 22, 2021.

(51) Int. Cl.
*G06F 12/00* (2006.01)
*G06F 12/0802* (2016.01)

(52) U.S. Cl.
CPC ...... *G06F 12/0802* (2013.01); *G06F 2212/72* (2013.01)

(58) Field of Classification Search
CPC .................................................. G06F 2212/72
See application file for complete search history.

(56) References Cited

U.S. PATENT DOCUMENTS

| 2019/0087305 A1 | 3/2019 | Mola |
| 2019/0258556 A1 | 8/2019 | Mola |
| 2019/0266086 A1 | 8/2019 | Mola et al. |

(Continued)

FOREIGN PATENT DOCUMENTS

| WO | 2019164710 A1 | 8/2019 | |
| WO | WO-2019164710 A1 * | 8/2019 | .......... G06F 11/3476 |

OTHER PUBLICATIONS

Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.

(Continued)

*Primary Examiner* — Shawn X Gu
(74) *Attorney, Agent, or Firm* — Workman Nydegger

(57) ABSTRACT

Cache-based trace logging using tags in an upper cache level. A processor influxes a cache line into a first cache level from an upper second cache level. Influxing the cache line into the first cache level includes, based on the first cache level being a recording cache, the processor reading a tag that is (i) stored in the second cache level and (ii) associated with the cache line. Based on reading the tag, the processor determines whether a first value of the cache line within the second cache level has been previously captured by a trace. The processor performs one of (i) when the first value is determined to have been previously logged, following a logged value logic path when influxing the cache line; or (ii) when the first value is determined to have not been previously logged, following a non-logged value logic path when influxing the cache line.

20 Claims, 7 Drawing Sheets

(56) References Cited

U.S. PATENT DOCUMENTS

| | | |
|---|---|---|
| 2019/0266090 A1 | 8/2019 | Mola |
| 2020/0026639 A1 | 1/2020 | Mola |
| 2022/0269614 A1 | 8/2022 | Mola et al. |
| 2022/0269615 A1 | 8/2022 | Mola et al. |

OTHER PUBLICATIONS

Narayanasamy, et al., "BugNet: Continuously Recording Program Execution for Deterministic Replay Debugging", In Proceedings of the 32nd International Symposium on Computer Architecture, Jun. 4, 2005, 12 Pages.

"International Search Report and Written Opinion Issued in PCT Application No. PCT/US2022/013441", dated Mar. 25, 2022, 12 Pages. (MS# 409626-WO-PCT).

"International Search Report and Written Opinion Issued in PCT Application No. PCT/US2022/013443", dated Mar. 25, 2022, 12 Pages. (MS# 409391-WO-PCT).

"International Search Report and Written Opinion Issued in PCT Application No. PCT/US2022/013444", dated Mar. 25, 2022, 12 Pages. (MS# 409626A-WO-PCT).

Xu, et al., "A "Flight Data Recorder" for Enabling Full-System Multiprocessor Deterministic Replay", In Proceedings of the 30th Annual International Symposium on Computer Architecture, Jun. 9, 2003, 12 Pages.

"Non Final Office Action Issued in U.S. Appl. No. 17/229,718", dated Jul. 11, 2022, 16 Pages.

U.S. Appl. No. 17/975,410, filed Oct. 27, 2022.
U.S. Appl. No. 17/229,718, filed Apr. 13, 2021.
U.S. Appl. No. 17/324,776, filed May 19, 2021.

"Final Office Action Issued in U.S. Appl. No. 17/229,718", dated Oct. 21, 2002, 17 Pages.

\* cited by examiner

CACHE-BASED TRACE LOGGING USING TAGS IN AN UPPER-LEVEL CACHE

CROSS-REFERENCE TO RELATED APPLICATIONS

This application claims priority to, and the benefit of, U.S. Provisional Patent Application Ser. No. 63/152,240, filed Feb. 22, 2021, entitled "CACHE-BASED TRACE LOGGING USING TAGS IN A HIGHER MEMORY TIER," the entire contents of which are incorporated by reference herein in their entirety.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors are triggered by a vast variety of factors such as data inputs, user inputs, race conditions (e.g., when accessing shared resources), etc. Given the variety of triggers, undesired software behaviors are often rare and seemingly random, and extremely difficult to reproduce. As such, it is often very time-consuming and difficult for a developer to identify a given undesired software behavior. Once an undesired software behavior has been identified, it is again often time-consuming and difficult to determine its root cause (or causes).

Developers use a variety of approaches to identify undesired software behaviors, and to then identify one or more locations in an application's code that cause the undesired software behavior. For example, developers often test different portions of an application's code against different inputs (e.g., unit testing). As another example, developers often reason about execution of an application's code in a debugger (e.g., by setting breakpoints/watchpoints, by stepping through lines of code, etc. as the code executes). As another example, developers often observe code execution behaviors (e.g., timing, coverage) in a profiler. As another example, developers often insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of an execution context is recorded into one or more trace files (i.e., an execution trace). Using some tracing techniques, an execution trace can contain "bit-accurate" historic execution trace data, which enables any recorded portion the traced execution context to be virtually "replayed" (e.g., via emulation) down to the granularity of individual instructions (e.g., machine code instructions, intermediate language code instructions, etc.). Thus, using "bit-accurate" trace data, diagnostic tools enable developers to reason about a recorded prior execution of subject context, as opposed to conventional debugging which is limited to a "live" forward execution. For example, using replayable execution traces, some historic debuggers provide user experiences that enable both forward and reverse breakpoints/watchpoints, that enable code to be stepped through both forwards and backwards, etc. Some historic profilers, on the other hand, are able to derive code execution behaviors (e.g., timing, coverage) from prior-executed code.

Some techniques for recording execution traces operate based largely on recording influxes to a microprocessor's (processor's) memory cache. However, since modern processors commonly execute at the rate of tens- to hundreds- of thousands of MIPS (millions of instructions per second), replayable execution traces of a program's thread can capture vast amounts of information, even if mere fractions of a second of the thread's execution are captured. As such, replayable execution traces quickly grow very large in size in memory and/or on disk.

BRIEF SUMMARY

Embodiments described herein reduce the size of replayable execution traces by performing cache-based trace logging using tags in a higher memory tier. One or more embodiments operate to log influxes to a first cache level, but leverage tags within an upper second cache level to track whether a value of a given cache line influx is already captured by an execution trace. In particular, during an influx of a cache line to the first cache level, embodiments consult a tag in the second cache level to determine if a current value of the cache line can be reconstructed from prior trace logging, such as trace logging performed in connection with a prior influx of the cache line to the first cache level. If so, embodiments refrain from capturing a current value of the cache line into the execution trace when influxing the cache line to the first cache level. Additionally, during evictions from the first cache level, embodiments determine whether the cache line being evicted is in a "logged state" within the first cache level (i.e., a current value of the cache line can be obtained from a prior-recorded trace, and/or can be constructed by replaying the prior-recorded trace) and sets a tag in the second cache level as appropriate to indicate whether or not the cache line that is being evicted is logged. In embodiments, performing cache-based trace logging while leveraging tags within an upper second cache level to track whether a value of a given cache line influx is already captured by an execution trace has a technical effect of reducing a number of cache influxes that are recorded into an execution trace. In embodiments, reducing the number of cache influxes that are recorded into an execution trace, in turn, has technical effects of reducing a size of the execution trace as compared to prior tracing techniques, and of reducing processor utilization for carrying out the recording of cache influxes as compared to prior tracing techniques.

In accordance with the foregoing embodiments of leveraging tags within an upper cache level, embodiments are directed to methods, systems, and computer program products for cache-based trace logging using tags in an upper cache level. In these embodiments, a processor influxes a cache line into a first cache level from a second cache level arranged as an upper cache level to the first cache level. Influxing the cache line by the processor includes, based at least on the first cache level being a recording cache level, reading a tag that is stored in the second cache level and that is associated with the cache line. Influxing the cache line by the processor also includes, based at least on reading the tag, determining whether a first value of the cache line within the second cache level has been previously captured by a trace. Influxing the cache line by the processor also includes performing one of (i) when the first value of the cache line is determined to have been previously captured by the trace, following a logged value logic path when influxing the cache line into the first cache level; or (ii) when the first value of the cache line is determined to have not been previously captured by the trace, following a non-logged value logic path when influxing the cache line into the first cache level.

These one or more other embodiments operate to log influxes to a first cache level, but leverage tags within system memory to track whether a value of a given cache line influx is already captured by an execution trace. In particular, during an influx of a cache line to the first cache level, embodiments consult a tag in system memory to determine if a current value of the cache line can be reconstructed from prior trace logging, such as trace logging performed in connection with a prior influx of the cache line to the first cache level. If so, embodiments refrain from capturing a current value of the cache line into the execution trace when influxing the cache line to the first cache level. Additionally, during evictions from the first cache level, embodiments determine whether the cache line being evicted is in a "logged state" within the first cache level (i.e., a current value of the cache line can be obtained from a prior-recorded trace, and/or can be constructed by replaying the prior-recorded trace) and sets a tag in system memory as appropriate to indicate whether or not the cache line that is being evicted is logged. In embodiments, performing cache-based trace logging while leveraging tags within system memory to track whether a value of a given cache line influx is already captured by an execution trace has a technical effect of reducing a number of cache influxes that are recorded into an execution trace. In embodiments, reducing the number of cache influxes that are recorded into an execution trace, in turn, has technical effects of reducing a size of the execution trace as compared to prior tracing techniques, and of reducing processor utilization for carrying out the recording of cache influxes as compared to prior tracing techniques.

In accordance with the foregoing embodiments of leveraging tags within system memory, embodiments are directed to methods, systems, and computer program products for cache-based trace logging using tags in system memory. In these embodiments, a processor influxes a cache line into a first cache level. Influxing the cache line by the processor includes, based at least on the first cache level being a recording cache level, reading a tag that is stored in system memory and that is associated with the cache line. Influxing the cache line by the processor also includes, based at least on reading the tag, determining whether a first value of the cache line has been previously captured by a trace. Influxing the cache line by the processor also includes performing one of (i) when the first value of the cache line is determined to have been previously captured by the trace, following a logged value logic path when influxing the cache line into the first cache level; or (ii) when the first value of the cache line is determined to have not been previously captured by the trace, following a non-logged value logic path when influxing the cache line into the first cache level.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein perform cache-based trace logging using tags in a higher memory tier. These embodiments operate to log influxes to a first cache level, but leverage tags within a higher memory tier (e.g., an upper second cache level or system memory) to track whether a value of a given cache line influx is already captured by an execution trace. In particular, during an influx of a cache line to the first cache level, embodiments consult a tag in the higher memory tier to determine if a current value of the cache line can be reconstructed from prior trace logging, such as trace logging performed in connection with a prior influx of the cache line to the first cache level. If so, embodiments refrain from capturing a current value of the cache line into the execution trace when influxing the cache line to the first cache level. Additionally, during evictions from the first cache level, embodiments determine whether the cache line being evicted is in a "logged state" within the first cache level (i.e., a current value of the cache line can be obtained from a prior-recorded trace, and/or can be constructed by replaying the prior-recorded trace), and sets a tag in the higher memory tier as appropriate to indicate whether or not the cache line that is being evicted is logged.

Figure 1A:
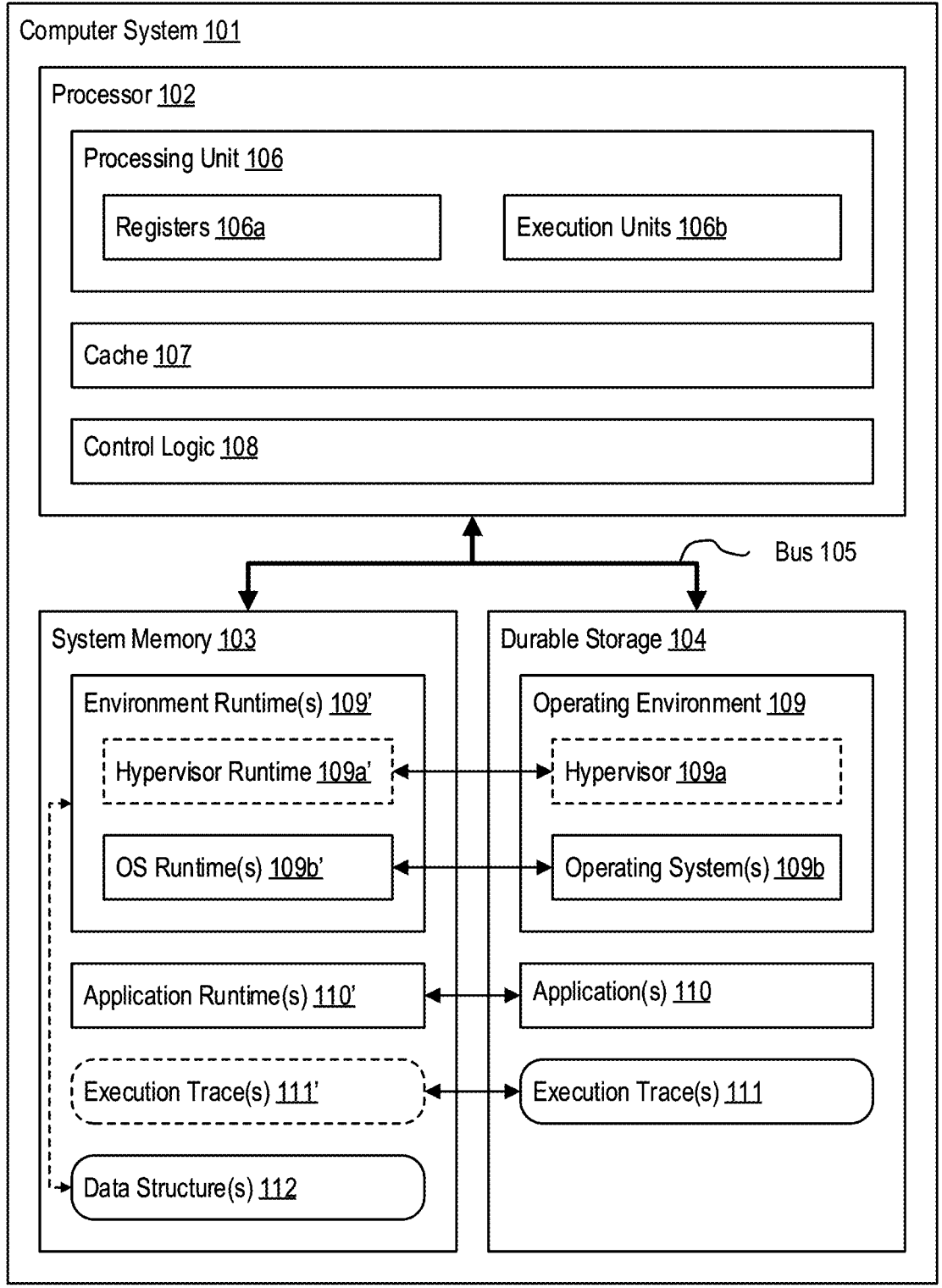
FIG. 1A illustrates an example computer architecture that facilitates an example computing environment that facilitates cache-based trace logging using tags in a higher memory tier to determine if a value of an influxed cache line has been previously captured by a trace.
Figure 1B:
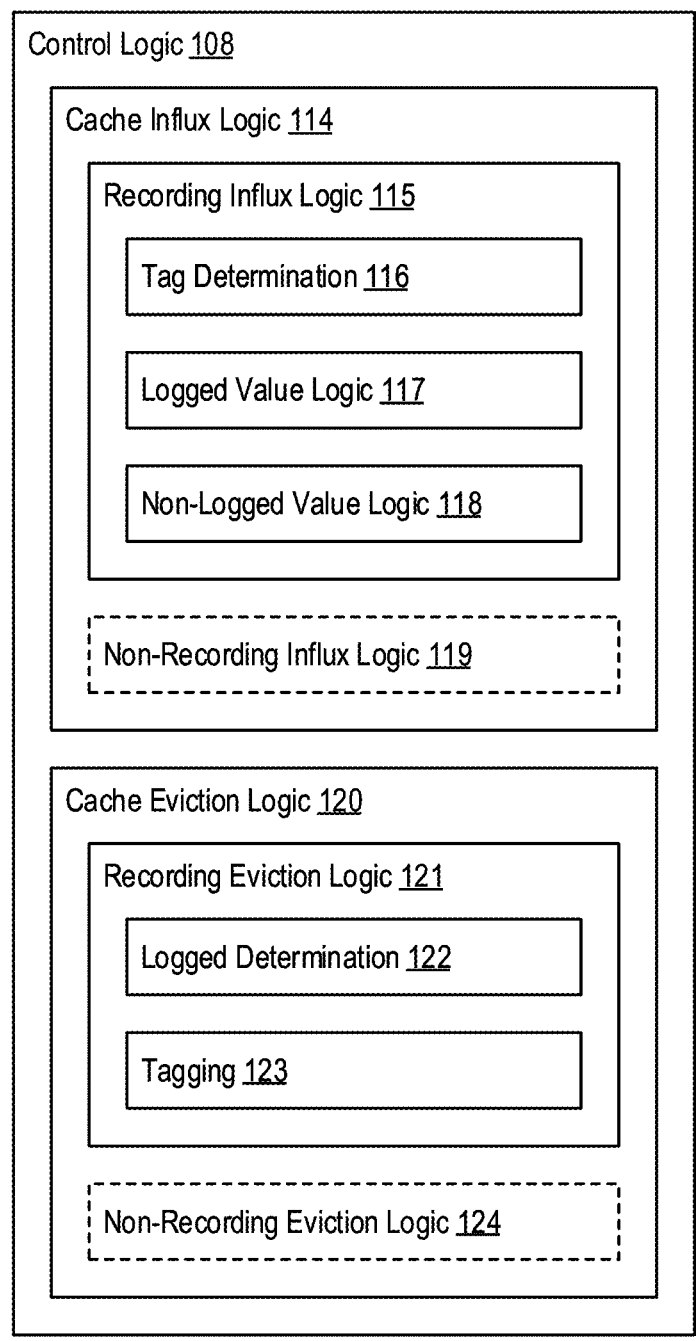
FIG. 1B illustrates additional detail of control logic for cache-based trace logging using tags in a higher memory tier.

To the accomplishment of these (and other) embodiments, FIG. 1A illustrates an example computing environment 100a that facilitates cache-based trace logging using tags in a higher memory tier to determine if a value of an influxed cache line has been previously captured by a trace. In particular, computing environment 100a includes a special-purpose or general-purpose computer system 101, which includes at least one processor 102 that is configured to perform a hardware-based execution trace logging, based on recording influxes to at least one level of a cache. As shown, in addition to processor(s) 102, computer system 101 also includes at least system memory 103 and durable storage 104, which are communicatively coupled to each other, and to the processor(s) 102, using at least one communications bus 105.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (not shown), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, in embodiments each processor 102 includes at least one processing unit 106, at least one cache 107, and control logic 108 (e.g., gate logic, executable microcode, etc.). Each processing unit 106 (e.g., processor core) loads and executes machine code instructions at one or more execution units 106b. During execution of these machine code instructions, the instructions can use internal processor registers 106a as temporary storage locations, and can read and write to various locations in system memory 103 via the cache 107. Each processing unit 106 in a given processor 102 executes machine code instructions that are defined by a processor instruction set architecture (ISA). The particular ISA of each processor 102 can vary based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, a machine code instruction is the smallest externally-visible (i.e., external to the processor) unit of code that is executable by a processor.

Registers 106a are hardware storage locations that are defined based on the ISA of the processor 102. In general, registers 106a are read from and/or written to by machine code instructions, or a processing unit 106, as those instructions execute at execution units 106b. Registers 106a are commonly used to store values fetched from the cache 107 for use as inputs to executing machine code instructions, to store the results of executing machine code instructions, to store a program instruction count, to support maintenance of a thread stack, etc. In some embodiments, registers 106a include "flags" that are used to signal some state change caused by executing machine code instructions (e.g., to indicate if an arithmetic operation cased a carry, a zero result, etc.). In some embodiments, registers 106a include one or more control registers (e.g., which are used to control different aspects of processor operation), and/or other processor model-specific registers (MSRs).

The cache 107 temporarily caches blocks of system memory 103 during execution of machine code instructions by one or more of processing units 106. In embodiments, the cache 107 includes one or more "code" portions that cache portions of system memory 103 storing application code, as well as one or more "data" portions that cache portions of system memory 103 storing application runtime data. If a processing unit 106 requests data (e.g., code or application runtime data) not already stored in the cache 107, then the processing unit 106 initiates a "cache miss," causing block(s) of data to be fetched from system memory 103 and influxed into the cache 107—while potentially replacing and "evicting" some other data already stored in the cache 107 back to system memory 103.

Figure 2:
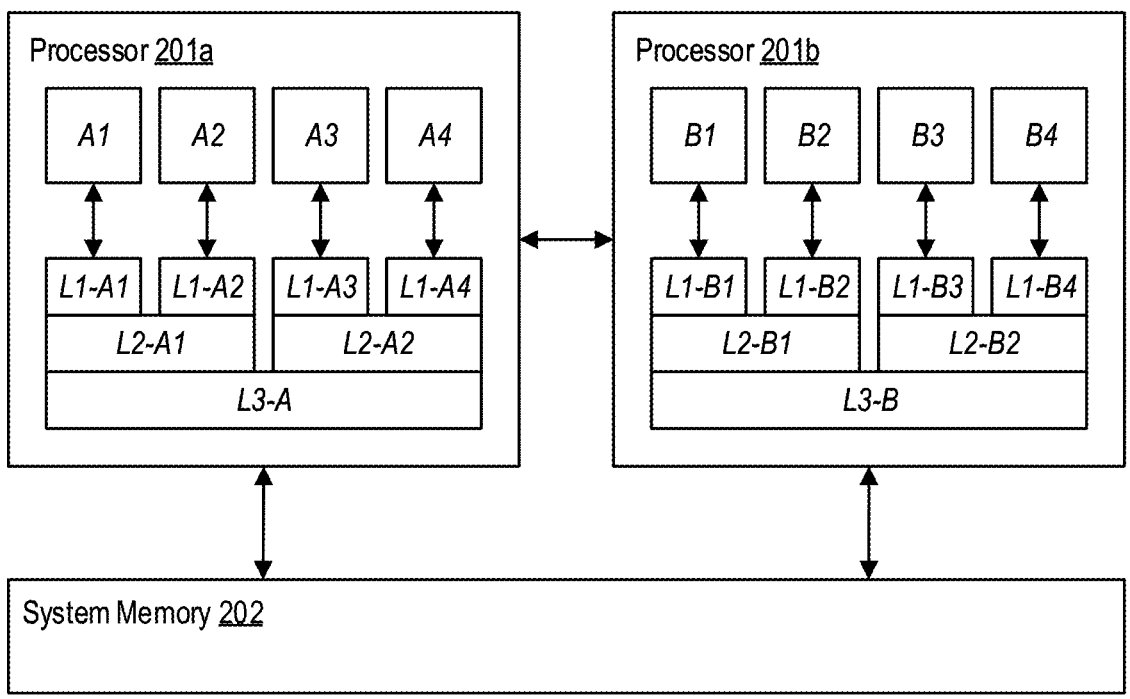
FIG. 2 illustrates an example environment demonstrating multi-level caches.

In the embodiments herein, the cache 107 comprises multiple cache levels (sometimes referred to cache tiers or cache layers)—such as a level 1 (L1) cache, a level 2 (L2) cache, a level 3 (L3) cache, etc. For example, FIG. 2 illustrates an example environment 200 demonstrating multi-level caches. In FIG. 2, the example environment 200 comprises two processors 201—processor 201a and processor 201b (e.g., processor(s) 102 of FIG. 1A) and a system memory 202 (e.g., system memory 103 of FIG. 1A). In the example environment 200, each processor 201 comprises four processing units (e.g., processing unit(s) 106 of FIG. 1A), including processing units A1-A4 for processor 201a and processing units B1-B4 for processor 201b.

In example environment 200, each processor 201 also includes a three-level cache hierarchy. Environment 200 is one example cache layout only, and it is not limiting to the cache hierarchies in which the embodiments herein may operate. In environment 200, each processing unit includes its own dedicated L1 cache (e.g., L1 cache "L1-A1" in processor 201a for unit A1, L1 cache "L1-A2" in processor 201a for unit A2, etc.). Relative to the L1 caches, each processor 201 also includes two upper-level L2 caches (e.g., L2 cache "L2-A1" in processor 201a that serves as a backing store for L1 caches L1-A1 and L1-A2, L2 cache "L1-A2" in processor 201a that serves as a backing store for L1 caches L1-A3 and L1-A4, etc.). Finally, relative to the L2 caches, each processor 201 also includes a single L3 cache (e.g., L3 cache "L3-A" in processor 201a that serves as a backing store for L2 caches L2-A1 and L2-A2, and L3 cache "L3-B" in processor 201b that serves as a backing store for L2 caches L2-B1 and L2-B2).

As shown, system memory 202 serves as a backing store for the L3 caches L3-A and L3-B. In this arrangement, and depending on cache implementation, cache misses in an L1 cache might be served by its corresponding L2 cache, its corresponding L3 cache, and/or system memory 202; cache misses in an L2 cache might be served by its corresponding L3 cache and/or system memory 202; and cache misses in an L3 cache might be served by system memory 202.

In some environments, some cache levels exist separate from a processor; for instance, in environment 200 one or both of the L3 caches could alternatively exist separate from processors 201, and/or environment 200 could include one or more additional caches (e.g., L4, L5, etc.) that exist separate from processors 201.

As demonstrated by the arrows within each processor 201, when multiple cache levels exist, each processing unit typically interacts directly with the lowest level (e.g., L1). In many implementations, data flows between the levels (e.g., an L3 cache interacts with the system memory 202 and serves data to an L2 cache, and the L2 cache in turn serves data to the L1 cache). However, as will be appreciated by one of ordinary skill in the art, the particular manner in which processing units interact with a cache, and the particular manner in which data flows between cache levels, may vary (e.g., depending on whether the cache is inclusive, exclusive, or some hybrid).

Given their arrangement, the caches in environment 200 may be viewed as "shared" caches. For example, each L2 and L3 cache serves multiple processing units within a given processor 201 and are thus shared by these processing units. The L1 caches within a given processor 201, collectively, can also be considered shared—even though each one corresponds to a single processing unit—because the individual L1 caches may coordinate with each other via a cache coherency protocol (CCP) to ensure consistency (i.e., so that each cached memory location is viewed consistently across all the L1 caches). The L2 caches within each processor 201 similarly may coordinate via a CCP. Additionally, each individual L1 cache may be shared by two or more physical or logical processing units, such as where the processor 201 supports hyper-threading, and are thus "shared" even at an individual level.

Figure 3:
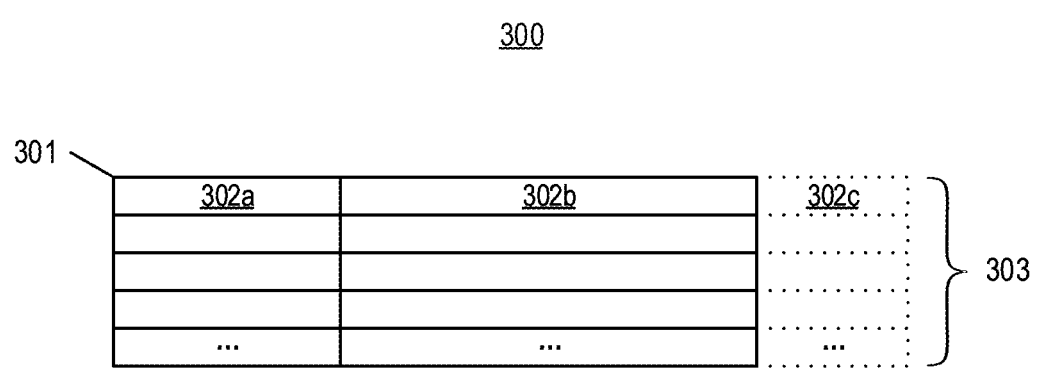
FIG. 3 illustrates an example of a processor cache that includes a plurality of entries.

In embodiments, each level of cache(s) 107 comprises a plurality of entries that store cache lines (also commonly referred to as cache blocks). Each cache line/block corresponds to a contiguous block of system memory 103. For example, FIG. 3 illustrates an example 300 of a processor cache 301 (e.g., an L1 cache, an L2 cache, etc.) that includes a plurality of entries 303. In example 300, each entry 303 comprises at least an address portion 302a that stores a memory address, and a cache line portion 302b that stores a block of data corresponding to that memory address. During an influx to a given entry 303 of the processor cache 301, the entry's cache line portion 302b is generally filled with a block of data obtained from an upper-level cache, or from the system memory 103. Depending on a size of the cache line portion 302b, each entry 303 may potentially store data spanning a plurality of consecutive individually addressable locations within the system memory 103. The cache line portion 302b of each entry 303 can be modified by one or more of processing units 106, and eventually be evicted back to an upper-level cache, or to the system memory 103. As indicated by the ellipses within the cache 301, each cache can include a large number of entries. For example, a contemporary 64-bit INTEL processor may contain individual L1 caches for each processing unit 106 comprising 512 or more entries. In such a cache, each entry is typically used to store a 64-byte (512-bit) value in reference to a 6-byte (48-bit) to 8-byte (64-bit) memory address. As shown, caches are generally larger in size (i.e., more cache entries) as their cache level increases. For example, an L2 cache is generally larger than an L1 cache, an L3 cache is generally larger than an L2 cache, and so on.

In some situations, the address portion 302a of each entry 303 stores a physical memory address, such as the actual corresponding memory address in the system memory 103. In other situations, the address portion 302a of each entry 303 stores a virtual memory address. In embodiments, a virtual memory address is an address within a virtual address space that is exposed by an operating system to a process executing at the processor(s) 102. This virtual address space provides one or more abstractions to the process, such as that the process has its own exclusive memory space and/or that the process has more memory available to it than actually exists within the system memory 103. Such abstractions can be used, for example, to facilitate memory isolation between different processes executing at the processor(s) 102, including isolation between user-mode processes and kernel-mode processes. In embodiments, virtual to physical memory address mappings are maintained within memory page tables that are stored in the system memory 103, and that are managed by an operating system and/or hypervisor (e.g., operating environment 109, described infra). In general, these memory page tables comprise a plurality of page table entries (PTEs) that map ranges (i.e., pages) of virtual memory addresses to ranges (i.e., pages) of physical memory addresses. In embodiments, each PTE stores additional attributes, or flags, about its corresponding memory pages, such as memory page permissions (e.g., read-only, writeable, etc.), page state (e.g., dirty, clean, etc.), and the like. In embodiments, one or more translation lookaside buffers (TLBs, not shown) within each processor 102 facilitates virtual addressing, and comprises a dedicated form of cache that stores recently obtained PTEs mapping virtual and physical memory pages, as obtained from the memory page tables stored in the system memory 103. In some implementations, PTEs are part of a multi-level hierarchy, which includes one or more page directory entries (PDEs) that support discovery of individual PTEs. If a processor 102 lacks a TLB, then it may lack support for virtual memory addressing.

As mentioned, caches coordinate using a CCP. In general, a CCP defines how consistency is maintained between various caches as various processing units read from and write data to those caches, and how to ensure that the processing units always read consistent data for a given cache line. CCPs are typically related to, and enable, a memory model defined by the processor's instruction set architecture (ISA). Examples of popular ISA's include the x86 and x86_64 families of architectures from INTEL, and the ARM architecture from ARM HOLDINGS. Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual cache line stored in a shared cache. A "modified" cache line contains data that has been modified in the shared cache and is therefore inconsistent with the corresponding data in the backing store (e.g., system memory 103 or another cache). When a cache line having the "modified" state is evicted from the shared cache, common CCPs require the cache to guarantee that its data is written back the backing store, or that another cache take over this responsibility. A "shared" cache line is not permitted to be modified, and may exist in a shared or owned state in another cache. The shared cache can evict this data without writing it to the backing store. An "invalid" cache line contains no valid data and can be considered empty and usable to store data from cache miss. An "exclusive" cache line contains data that matches the backing store and is used by only a single processing unit. It may be changed to the "shared" state at any time (i.e., in response to a read request) or may be changed to the "modified" state when writing to it. An "owned" cache location contains data that that is inconsistent with the corresponding data in the backing store. When a processing unit makes changes to an owned cache location, it notifies the other processing units—since the notified processing units may need to invalidate or update based on the CCP implementation.

As shown, each entry in the cache 301 may include one or more additional portions 302c. In some embodiments, one additional portion 302c comprises one or more tracking bits used to track whether a cache line stored in a corresponding entry 303 has been logged to a trace or not, as described infra. In some embodiments, an additional portion 302c stores a tag that comprises one or more data fields for storing information relevant to its corresponding entry 303. In embodiments, the entries of at least one cache level comprises the additional portion 302c for storing tags, and those embodiments use those tags to improve trace logging, as described infra.

Returning to FIG. 1A, in embodiments, control logic 108 comprises microcode (i.e., executable instructions) and/or physical logic gates that control operation of the processor 102. In general, control logic 108 functions as an interpreter between the hardware of the processor 102 and the processor ISA exposed by the processor 102 to executing applications (e.g., operating environment 109 and application(s) 110) and controls internal operation of the processor 102. In embodiments, the control logic 108 is embodied on on-processor storage, such as ROM, EEPROM, etc. In some embodiments, this on-processor storage is writable (in which case the control logic 108 is updatable), while in other embodiments this on-processor storage is read-only (in which case the control logic 108 cannot be updated).

The durable storage 104 stores computer-executable instructions and/or data structures representing executable software components. Correspondingly, during execution of these software components at the processor(s) 102, one or more portions of these computer-executable instructions and/or data structures are loaded into system memory 103. For example, the durable storage 104 is illustrated as storing computer-executable instructions and/or data structures corresponding to an operating environment 109 and one or more application(s) 110. Correspondingly, the system memory 103 is shown as storing one or more operating environment runtime(s) 109' (e.g., machine code instructions and/or runtime data supporting execution of the operating environment 109), and as storing one or more application runtime(s) 110' (e.g., machine code instructions and/or runtime data supporting execution of one or more of application(s) 110). The system memory 103 and durable storage 104 can also store other data, such as one or more replayable execution trace(s) (i.e., execution trace(s) 111' stored in system memory 103 and/or execution trace(s) 111 stored in durable storage 104) and one or more data structure(s) 112 that facilitate communication between operating environment 109 and control logic 108 during tracing of application(s) 110.

In FIG. 1A, operating environment 109 is shown as potentially including a hypervisor 109a, and as including one or more operating system(s) 109b. Correspondingly, the operating environment runtime(s) 109' is shown as potentially including a hypervisor runtime 109a', and as including one or more operating system runtime(s) 109b'. For example, in some embodiments, the operating environment 109 comprises the hypervisor 109a executing directly on the hardware (e.g., processor(s) 102, system memory 103, and durable storage 104) of computer system 101, and one or more of the operating system(s) 109b executing on top of the hypervisor 109a. In other embodiments, however, the operating environment 109 comprises an operating system 109b executing directly on the hardware (e.g., processor(s) 102, system memory 103, and durable storage 104) of computer system 101.

In embodiments, the operating environment 109 and the control logic 108 cooperate to record one or more replayable execution trace(s) 111/111' of code execution at the processor(s) 102. In embodiments, tracing techniques utilized by the operating environment 109 and control logic 108 to record replayable execution traces 111/111' are based at least on the processor(s) 102 recording influxes to at least a portion of their cache(s) 107 during code execution. In embodiments, each replayable execution trace 111/111' comprises a "bit-accurate" record of execution of a corresponding context (e.g., process, operating system, virtual machine, enclave, hypervisor, etc.) as that context executed at the processor(s) 102. As used herein, a replayable execution trace is a "bit accurate" record of that context's execution activity. This bit-accurate record enables machine code instructions that were previously executed as part of the context at the processing unit(s) 106 to be replayed later, such that, during replay, these machine code instructions are re-executed in the same order, and consume the same data that they did during trace recording. While a variety of bit-accurate tracing approaches are possible, as mentioned, the embodiments herein record a bit-accurate execution trace based on logging at least some of the influxes to cache(s) 107 during execution of a traced context (e.g., process, virtual machine, etc.). By logging at least some of these influxes during execution of the context, a replayable execution trace 111/111' of that context captures at least some of the memory reads that were performed by the machine code instructions that executed as part of the context.

The cache-based tracing techniques used by the embodiments herein are built upon an observation that each processor 102 (including its the cache(s) 107) form a semi- or quasi-closed system. For example, once portions of data for an executing context (i.e., machine code instructions and runtime data) are loaded into a processor's cache(s) 107, a processing unit 106 can continue executing that context—without any other external input—as a semi- or quasi-closed system for bursts of time. In particular, once the cache(s) 107 are loaded with machine code instructions and runtime data, the execution unit 106b can load and execute those machine code instructions from the cache(s) 107, using runtime data stored in the cache(s) 107 as input to those machine code instructions, and using the registers 106a. So long as the data (i.e., machine code instructions and runtime data) that are needed for the processor 102 to execute that thread exists within the cache(s) 107, the processor 102 can continue executing that context without further external input.

When a processing unit 106 needs some influx of data (e.g., because a machine code instruction it is executing, will execute, or may execute accesses code or runtime data not already in the cache(s) 107), the processor 102 may execute a "cache miss," importing data into the cache(s) 107 from the system memory 103. For example, if a data cache miss occurs when a processing unit 106 executes a machine code instruction that performs a memory operation on a memory address within application runtime 110' storing runtime data, the processor 102 imports runtime data from that memory address in the system memory 103 to one of the cache lines of the data portion of the cache(s) 107. Similarly, if a code cache miss occurs when a processing unit 106 tries to fetch a machine code instruction from a memory address within application runtime 110' storing application code, the processor 102 imports code data from that memory address in system memory 103 to one of the cache lines of the code portion of the cache(s) 107. The processing unit 106 then continues execution using the newly-imported data, until new data is needed.

In embodiments, each processor 102 is enabled to record a bit-accurate representation of execution of a context executing at the processor 102, by recording, into a trace data stream corresponding to the context, sufficient data to be able to reproduce the influxes of information into the processor's cache(s) 107 as the processor's processing units 106 execute that context's code. For example, some approaches to recording these influxes operate on a per-processing-unit basis. These approaches involve recording, for each processing unit that is being traced, at least a subset of cache misses within the cache(s) 107, along with a time during execution at which each piece of data was brought into the cache(s) 107 (e.g., using a count of instructions executed or some other counter). In some embodiments, these approaches involve also recording, for each processing unit that is being traced, any un-cached reads (i.e., reads from hardware components and un-cacheable memory that bypass the cache(s) 107) caused by that processing unit's activity, as well as the side-effects of having executed any non-deterministic processor instructions (e.g., one or more values of register(s) 106a after having executed a non-deterministic processor instruction).

Figure 4:
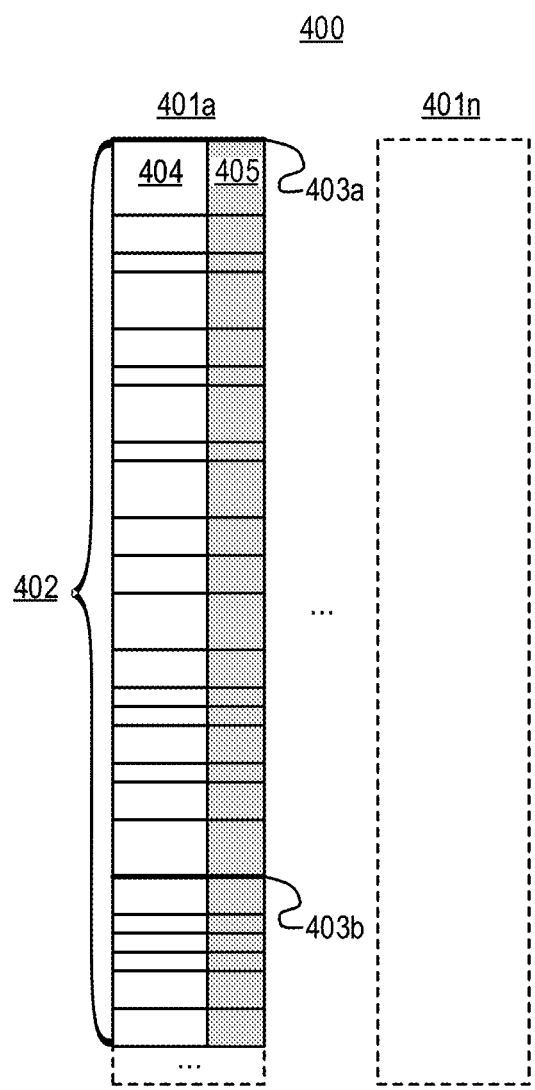
FIG. 4 illustrates an example of an execution trace.

FIG. 4 illustrates an example of an execution trace (e.g., one of execution trace(s) 111/111'). In particular, FIG. 4 illustrates an execution trace 400 that includes a plurality of data streams 401 (i.e., data streams 401a-401n). In embodiments, each data stream 401 represents execution of a different context, such as a different thread that executed from the code of an application 110. In an example, data stream 401a records execution of a first thread of an application 110, while data stream 401n records an nth thread of the application 110. As shown, data stream 401a comprises a plurality of data packets 402. Since the particular data logged in each data packet 402 can vary, these data packets are shown as having varying sizes. In embodiments, when using time-travel debugging technologies, a data packet 402 records the inputs (e.g., register values, memory values, etc.) to one or more executable instructions that executed as part of this first thread of the application 110. In embodiments, memory values are obtained as influxes to cache(s) 107 and/or as uncached reads. In embodiments, data stream 401a also includes one or more key frames 403 (e.g., key frames 403a and 403b) that each records sufficient information, such as a snapshot of register and/or memory values, that enables the prior execution of the thread to be replayed, starting at the point of the key frame and proceeding forward.

In embodiments, an execution trace also includes the actual code that was executed as part of an application 110. Thus, in FIG. 4, each data packet 402 is shown as including a data inputs portion 404 (non-shaded) and a code portion 405 (shaded). In embodiments, the code portion 405 of each data packet 402, if present, includes the executable instructions that executed based on the corresponding data inputs. In other embodiments, however, an execution trace omits the actual code that was executed, instead relying on having separate access to the code of the application 110 (e.g., from durable storage 104). In these other embodiments, each data packet specifies an address or offset to the appropriate executable instruction(s) in an application binary image. Although not shown, it is possible that the execution trace 400 includes a data stream 401 that stores one or more of the outputs of code execution. It is noted that used of different data input and code portions of a data packet is for illustrative purposes only, and that the same data could be stored in a variety of manners, such as by the use of multiple data packets.

If there are multiple data streams 401, in embodiments these data streams include sequencing events. Each sequencing event records the occurrence of an event that is orderable across different execution contexts, such as threads. In one example, sequencing events correspond to interactions between the threads, such as accesses to memory that is shared by the threads. Thus, for instance, if a first thread that is traced into a first data stream (e.g., 401a) writes to a synchronization variable, a first sequencing event is recorded into that data stream (e.g., 401a). Later, if a second thread that is traced into a second data stream (e.g., 401b) reads from that synchronization variable, a second sequencing event is recorded into that data stream (e.g., 401b). These sequencing events are inherently ordered. For example, in some embodiments each sequencing event is associated with a monotonically incrementing value, with the monotonically incrementing values defining a total order among the sequencing events. In one example, a first sequencing event recorded into a first data stream is given a value of one, a second sequencing event recorded into a second data stream is given a value of two, etc.

Some bit-accurate tracing approaches leverage extensions to a processor cache that track whether the value of a given cache line can be considered to have been captured into an execution trace 111 on behalf of at least one processing unit. In various implementations, these cache modifications extend the entries of one or more of processor's caches to include additional "logging" bits (e.g., portion 302c), or reserve one or more entries for logging bit use. These logging bits enable a processor to identify, for each cache line, one or more processing units that consumed/logged the cache line. Use of logging bits can enable the processor's control logic to avoid re-logging cache line influxes for one execution context after a processing unit transitions to another execution context (e.g., another thread, another virtual machine, kernel mode, etc.) if that other context did not modify the cache line. Additionally, use of logging bits can enable a trace entry for one context to reference data already logged on behalf of another context.

Additional, or alternative, bit-accurate tracing approaches use memory markings as logging cues. More particularly, in embodiments, the operating environment 109 and the control logic 108 cooperate to record replayable execution trace(s) 111/111' based on categorizing different memory regions, such as physical memory pages in system memory 103, as logged or not logged. In embodiments, an execution context corresponds to at least one of a process executing on top of an operating system 109b, an operating system 109b, a virtual machine/memory partition created by the hypervisor 109a, an enclave, a nested hypervisor, and the like. In embodiments, using memory markings as logging cues for processor-based execution tracing is based at least on (i) the operating environment 109 maintaining one or more data structure(s) 112 that categorize different memory regions as being logged and not logged, and on (ii) the processor(s) 102 using these data structure(s) 112 to make logging decisions during tracing.

Additional, or alternative, bit-accurate tracing approaches utilize associative caches, coupled with processor cache way-locking features of some processors to reserve a subset of the cache for an entity that being traced, and then logs cache misses relating to that entity into a reserved subset of the cache. In particular, some bit-accurate tracing approaches utilize way-locking to reserve one or more cache "ways" for an entity that is being traced, such that the locked/reserved ways are used exclusively for storing cache misses relating to execution of that entity. Thus, by virtue of which way(s) to which a cache entry belongs, embodiments can determine whether or not a corresponding cache line has been logged.

Regardless of which tracking technique(s) are used, in embodiments the control logic 108 logs based on influxes at a particular level in a multi-level cache. For example, in embodiments the control logic 108 logs influxes at an L2 cache level, even if one or more higher cache levels are present. In general, logging influxes to a cache with relatively more cache entries results in smaller traces than logging influxes to a cache with relatively fewer cache entries. This is because a larger cache generally has fewer evictions than a smaller cache, and thus the larger cache has fewer influxes of the same cache data (and thus, there is less duplicate logging of the same cache line data). As such, from a trace size perspective, it is often desirable to log at a higher (upper) cache level (which is generally larger in size than a lower cache level). However, from an implementation and cost perspective, it is often desirable to implement logging at a lower cache level. For example, it may be less costly (e.g., in terms of processor die size) to implement tracking mechanisms at a lower cache level than it is a higher cache level.

The embodiments herein strike a balance between these competing goals by implementing control logic 108 that intelligently determines whether or not to log an influx of a cache line into a first cache level based on using a tag in a higher memory tier (e.g., an upper second cache level, or system memory 103) to determine if a value of the cache line that is being influxed has been previously captured into a trace, such as in connection with a prior influx of the cache line to the first cache level. To demonstrate some embodiments of how the control logic 108 accomplishes the foregoing, FIG. 1E3 illustrates an example computing environment 100b showing additional detail of control logic 108, including components that embodiments of the control logic 108 uses when interacting with the cache 107. The depicted components of control logic 108, together with any sub-components, represent various functions that the control logic 108 might implement or utilize in accordance with various embodiments described herein. It will be appreciated, however, that the depicted components—including their identity, sub-components, and arrangement—are presented merely as an aid in describing various embodiments of the control logic 108 described herein, and that these components are non-limiting to how software and/or hardware might implement various embodiments of the control logic 108 described herein, or of the particular functionality thereof.

As shown, the control logic 108 comprises cache influx logic 114 that operates to influx a cache line into a recording cache level (i.e., a cache level into which influxes are being logged), and cache eviction logic 120 that operates to evict a cache line from the recording cache level. In some embodiments, the control logic 108 supports the enabling and disabling of recording features of a processor, which may be supported globally, per-processing unit, per execution context, etc. Thus, the cache influx logic 114 is shown as comprising recording influx logic 115 that operates when infuxing a cache line to a cache that is currently recording, and as potentially comprising non-recording influx logic 119 that operates when infuxing a cache line to a cache that is not currently recording. Similarly, the cache eviction logic 120 is shown as comprising recording eviction logic 121 that operates when evicting a cache line from a cache that is recording, and as potentially comprising non-recording eviction logic 124 that operates when evicting a cache line from a cache that is not recording.

Turning to the cache influx logic 114, the recording influx logic 115 comprises a tag determination component 116, logged value logic 117, and non-logged value logic 118. In general, when a cache line is being influxed from an upper-level cache (e.g., an L3 cache in FIG. 2) or system memory 202 into a cache level that is being logged (e.g., an L2 cache in FIG. 2), the tag determination component 116 reads a tag in the higher memory tier (e.g., an upper-level cache or system memory 202) to determine if there is an indicium within the tag that a value of the cache line has been previously captured by an execution trace 111. In some embodiments, a value of the cache line is considered to have been previously captured by an execution trace 111 if the present value of the cache line in an upper-level cache is recorded in the execution trace 111. An additional, or alternative, embodiments a value of the cache line is considered to have been previously captured by an execution trace 111 if the present value of the cache line in the upper-level cache can be reconstructed based on the execution trace 111—such as by obtaining a prior value of the cache line from the execution trace 111, and then replaying one or more executable instructions based on the execution trace 111 to transform that cache line to arrive at the present value of the cache line in the upper-level cache. The indicium can vary by implementation and comprises value(s) stored within one or more fields of the tag. For example, in embodiments the tag comprises at least one of a field for storing an indication of whether or not the cache line has been logged (e.g., a single bit "logged" flag), a field for storing an address space identifier (ASID) for which the cache line has been logged, a field for storing a virtual machine identifier (VMID) for which the cache line has been logged, a field for storing an exception level (e.g., ARM processors), a field for storing a ring (e.g., x86 processors), or a field for storing a security state (e.g., ARM processors).

In embodiments, if the tag determination component 116 identifies, within the tag, one or more indicia that the cache line was logged (e.g., a logged flag being set, the presence of an ASID, the presence of a VMID, etc.), then the tag determination component 116 further determines if the cache line has definitely not been modified after a most recent prior eviction from any recording cache level (e.g., based on the tag having been modified, based on CCP state stored in the tag or elsewhere, etc.). When the tag determination component 116 identifies an indicium that the cache line was logged, and when the tag determination component 116 further determines that the cache line has definitely not been modified after a most recent prior eviction from any recording cache level, then the tag determination component 116 concludes that the value of the cache line has been previously captured by an execution trace 111. In this case, the cache influx logic 114 follows a logic path defined by the logged value logic 117. In general, the logged value logic 117 handles an influx of the cache line while refraining from logging a value of the cache line into an execution trace 111. Even though the logged value logic 117 does not log the value of the cache line, in embodiments the logged value logic 117 does take appropriate action to indicate that the cache line has been logged, such as by appropriately setting tracking bits associated with an entry into which the cache line was stored, by influxing the cache line into a logged way, etc. In embodiments, the logged value logic 117 may store, into an execution trace 111, a reference to prior-logged value of the cache line.

On the other hand, if the determination component 116 cannot identify an indicium that the cache line was logged, or if the tag determination component 116 determination component 116 cannot definitively determine that the cache line has not been modified after a prior eviction from the recording cache level (e.g., the cache line was definitely not logged, or it is indeterminate as to whether the cache line was logged), then the tag determination component 116 concludes that the value of the cache line has not been previously captured by an execution trace 111. In this case, the cache influx logic 114 follows a logic path defined by the non-logged value logic 118. In general, the non-logged value logic 118 handles an influx of the cache line as appropriate for a cache line that has not been previously logged. In embodiments, the non-logged value logic 118 operates in substantially the same manner as prior bit-accurate tracing approaches that lacked a consideration of tags in an upper-level cache. Thus, the particular action (or inaction) of the non-logged value logic 118 can vary depending on the tracing approach being used, such as logging bits, memory page marking, way locking, etc. In some embodiments, the non-logged value logic 118 captures a value of the cache line into an execution trace 111 in connection with performing the influx, and takes appropriate action to indicate that the cache line has been logged (e.g., by appropriately setting tracking bits associated with an entry into which the cache line was stored, by influxing the cache line into a logged way, etc.). In other embodiments, there is separate control logic 108 that will capture the value of the cache line based on a subsequent trigger, so the non-logged value logic 118 influxes the cache line without capturing a value of the cache line into an execution trace 111 and/or without indicating that the cache line is logged. At times, the non-logged value logic 118 may refrain from logging the cache line altogether.

Turning to the cache eviction logic 120, the recording eviction logic 121 comprises a logged determination component 122 and a tagging component 123. In general, when a cache line is being evicted from a cache level that is being logged (e.g., an L2 cache in FIG. 2) to an upper-level cache (e.g., an L3 cache in FIG. 2) or system memory 202 the logged determination component 122 determines if a current value of that cache line has been captured into an execution trace 111 at the recording cache level. In some embodiments, the logged determination component 122 determines that a current value of the cache line has been captured by the execution trace 111 if the current value of the cache line in the recording cache level is recorded in the execution trace 111 (e.g., in cases where the cache line was logged during an influx, and the cache line was not modified prior to the eviction). An additional, or alternative, embodiments the logged determination component 122 determines that a current value of the cache line has been captured by the execution trace 111 if the current value of the cache line in the recording cache level can be reconstructed based on the execution trace 111 (e.g., in cases where the cache line was logged during an influx, but the cache line was modified by logged instructions prior to the eviction). If the current value of that cache line has been captured, then the cache eviction logic 120 may choose to set a tag in a higher memory tier (e.g., an upper-level cache or system memory 202) with an indicium that the cache line has been previously captured by an execution trace 111. Otherwise, the cache eviction logic 120 ensures that the tag in the higher memory tier indicates that the cache line has not been logged. Thus, depending on the determination by the logged determination component 122, the tagging component 123 may set one or more fields within a tag to indicate whether or not the cache line has been logged. In embodiments, this includes setting at least one of a field for storing an indication of whether or not the cache line has been logged (e.g., a single-bit "logged" flag), a field for storing an ASID for which the cache line has been logged, a field for storing a VMID for which the cache line has been logged, a field for storing an exception level (e.g., ARM processors), a field for storing a ring (e.g., x86 processors), or a field for storing a security state (e.g., ARM processors). In embodiments, a lack of an ASID or a VMID in the second and/or third fields indicates that the cache line has not been logged. In embodiments, when tag data is stored in system memory, the data stored is sufficient to determine if a cache line was captured or not (e.g., a single bit flag). In embodiments, tag data in main memory is stored in one or more data structures, such as one or more bitmaps, one or more tree structures (e.g., similar to page table structures), and the like.

In some alternative embodiments, the cache influx logic 114, rather than the cache eviction logic 120 handles updating of tags to indicate when cache lines have been logged. For example, in some embodiments, in connection with logging a cache line, the non-logged value logic 118 operates much like the tagging component 123 to set one or more fields within a tag in a higher memory tier to indicate that the cache line has been logged. In some embodiments, there is separate logging and influx logic, such that there are independent logging and influx operations. In these embodiments, the act of logging and setting tracking information (e.g., logging bits) may also set a tag in a higher memory tier (or trigger and eventual update of the tag). In embodiments, logging actions ensure that there is consistency between a cache line's logging status and a tag in the higher memory tier, even if those logging actions are not made in connection with a cache influx. For example, if a cache line's "logged" status is cleared (e.g., due to a write by a non-logged context) while it is in a recording cache level, then a corresponding tag is also cleared (or eventually cleared) in the higher memory tier; later, if the cache line's "logged" status is set, then the corresponding tag is also set (or eventually set) in the higher memory tier.

Operation of the control logic 108 is now described in greater detail in connection with FIGS. 5A and 5B which illustrate methods of cache-based trace logging using tags in a higher memory tier. The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 5A:
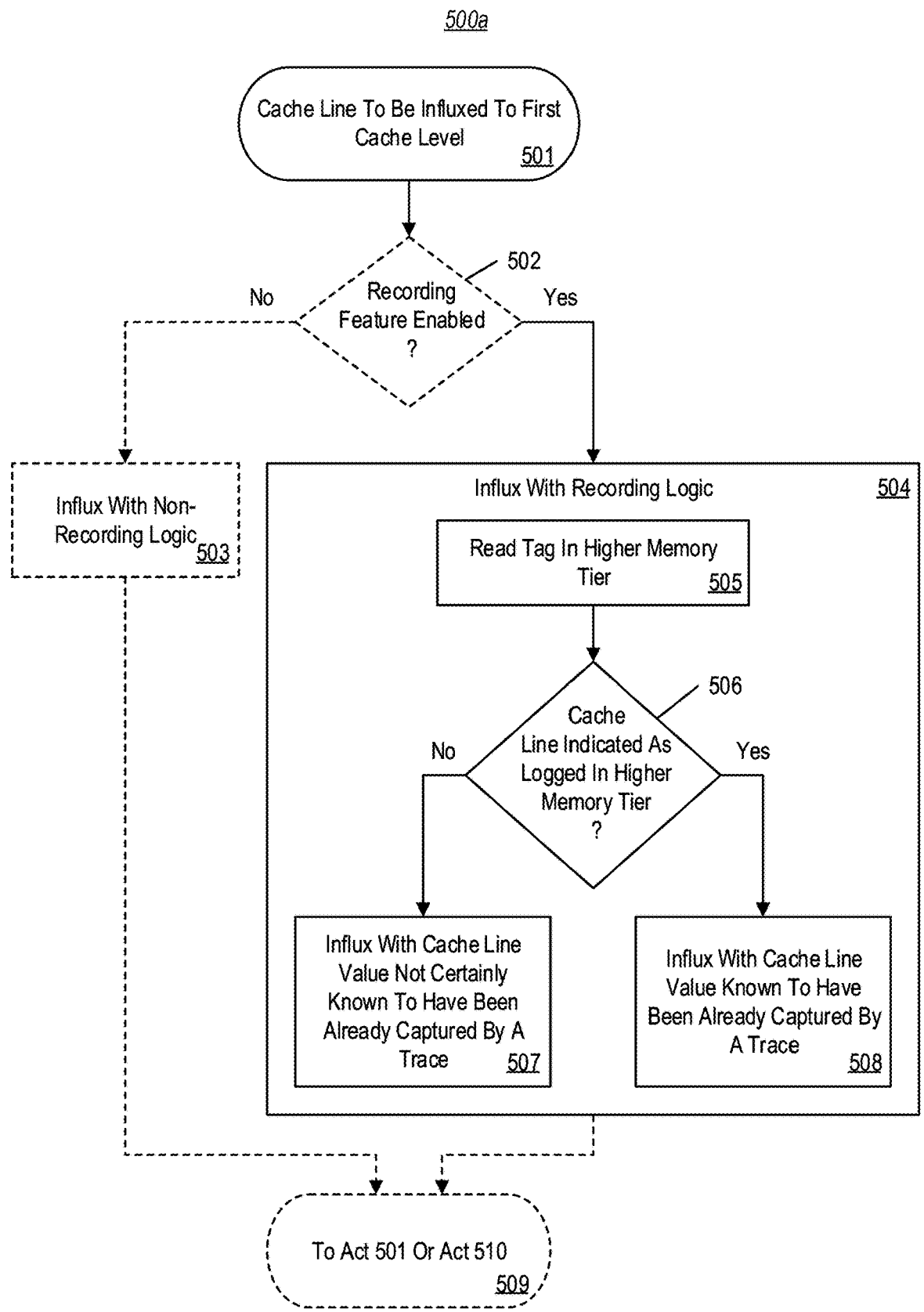
FIG. 5A illustrates a flow chart of an example method for using tags in a higher memory tier to determine whether or not to log a cache line influx.

FIG. 5A illustrates a flow chart of an example method 500*a* for using tags in a higher memory tier to determine whether or not to log a cache line influx. FIG. 5B illustrates a flow chart of an example method 500*b* for setting tags in a higher memory tier during a cache line eviction. In some embodiments, method 500*a* and method 500*b* are treated as entirely separate methods. In other embodiments, method 500*a* and method 500*b* are treated as being part of a single combined method. Methods 500*a* and 500*b* refer to a first cache level that is a recording cache level, and a higher memory. In various embodiments, the higher memory tier is a second cache level arranged as an upper cache level to the first cache level, or main memory (e.g., system memory 103). In one example, and referring to FIG. 2, the first cache level is an L1 cache and the higher memory tier is an L2 cache, an L3 cache, or higher (e.g., an L4 cache or system memory 202). In another example, the first cache level is an L2 cache and the higher memory tier is an L3 cache, or higher. In another example, the first cache level is an L3 cache and the higher memory tier is an L4 cache, or higher. Methods 500*a*/500*b* will now be described with respect to the components and data of computing environments 100*a* and 100*b* and the example environment 200 of FIG. 2.

Turning initially to FIG. 5A, method 500*a* begins at an act 501 where there is a cache line to be influxed to a first cache level. In general, act 501 comprises influxing a cache line into a first cache level. In some embodiments, act 501 comprises influxing a cache line into a first cache level from a second cache level arranged as an upper cache level to the first cache level. For example, based on activity by processing unit A1, a cache line is influxed from cache L3-A to cache L2-A1; in this example, the first cache level is an L2 cache, and the higher memory tier is an L3 cache. In other embodiments, act 501 comprises influxing a cache line into a first cache level from system memory. For example, based on activity by processing unit A1, a cache line is influxed from system memory 202 cache L2-A1 (e.g., where cache L3-A is not present).

As mentioned, some embodiments enable processor recording features to be enabled or disabled, such as globally, per-processing unit, per execution context, etc. In these embodiments, method 500*a* proceeds to an act 502 of determining if a recording feature is enabled. In an example, the cache influx logic 114 determines if trace recording is enabled or disabled, such as by checking a register value or some other toggleable value. When method 500*a* comprises act 502, it will be appreciated that the first cache level referred to in act 501 is a recording cache level only when a recording feature of the processor is enabled.

If method 500*a* comprises act 502, and if the recording feature is determined to not be enabled in act 502, then in embodiments method 500*a* proceeds to an act 503 of influxing with non-recording logic (i.e., using non-recording influx logic 119), which in embodiments ignores any tags associated with the influxed cache line (at least for recording purposes). Conversely, if method 500*a* comprises act 502, and if the recording feature is determined to be enabled in act 502, or if method 500*a* lacks act 502 (i.e., a recording feature is always active), then in embodiments method 500*a* proceeds to an act 504 of influxing with recording logic (i.e., using recording influx logic 115).

As shown, act 504 comprises an act 505 of reading a tag in a higher memory tier. In general, act 505 comprises, based at least on the first cache level being a recording cache level, reading a tag that is stored in a higher memory tier and that is associated with the cache line. In some embodiments, act 502 comprises reading a tag that is stored in the second cache level and that is associated with the cache line. For example, the tag determination component 116 reads a tag within cache L3-A, and which is associated with the cache line that is being influxed into cache L2-A1. In other embodiments, act 502 comprises reading a tag that is stored in system memory and that is associated with the cache line. In an example, the tag determination component 116 reads a tag within system memory 202, and which is associated with the cache line that is being influxed into cache L2-A1.

Act 504 proceeds to an act 506 of determining if the cache line is indicated as logged in the higher memory tier. In general act 506 comprises, based at least on reading the tag, determining whether a first value of the cache line has been previously captured by a trace. In some embodiments, act 506 comprises, based at least on reading the tag, determining whether a first value of the cache line within the second cache level has been previously captured by a trace. In other embodiments, act 506 comprises, based at least on reading the tag, determining whether a first value of the cache line within system memory has been previously captured by a trace. For example, the tag determination component 116 determines, from the tag read in act 505, if there is an indicium within the tag that a value of the cache line, as influxed into cache L2-A1 in act 501, has been previously captured to an execution trace 111 in connection with a prior influx to cache L2-A1. If so, the tag determination component 116 also determines if the cache line has definitely not been modified (e.g., within cache L3-A, system memory) after a prior eviction from cache L2-A1. If there is an indicium that a value of the cache line has been previously captured, and if the cache line has definitely not been modified after a prior eviction from cache L2-A1, then the tag determination component 116 concludes that the cache line is indicated as logged in the higher memory tier (i.e., "Yes" from act 506). Otherwise, the tag determination component 116 concludes that the cache line is not indicated as logged in the higher memory tier (i.e., "No" from act 506). In embodiments, the first value of the cache line is determined to have been previously captured by the trace when CCP data indicates that the cache line has not been modified within an upper second cache level, and the first value of the cache line is determined to have not been previously captured by the trace when the CCP data indicates that the cache line could have been modified within the upper second cache level.

Depending on the determination of act 506, act 504 either comprises an act 507 of influxing with the cache line value not certainly known to have been already captured by a trace (i.e., following the "No" path from act 506), or an act 508 of influxing with the cache line value known to have been already captured by a trace (i.e., following the "Yes" path from act 506).

In some embodiments act 507 comprises, when the first value of the cache line is determined to have not been previously captured by the trace, following a non-logged value logic path when influxing the cache line into the first cache level. In an example, cache influx logic 114 follows a logic path defined by the non-logged value logic 118 when influxing the cache line, and thus cache line is influxed to cache L2-A1 while taking an appropriate logging action (if any). Accordingly, in act 507, the non-logged value logic path stores the cache line into an entry within the first cache level while initiating logging of the first value of the cache line into the trace. In some embodiments, the non-logged value logic 118 updates the tag in the higher memory tier to indicate that the cache line has been logged. Thus, in some embodiments, the non-logged value logic path ensures that the tag stored in the higher memory tier indicates that the cache line has been logged. In an example, the non-logged value logic 118 sets one or more fields within a tag in cache L3-A, or in system memory 202, to indicate that the cache line has not been logged, such as by appropriately setting or clearing a "logged" flag, ensuring that an ASID field is clear or has changed, or ensuring that a VMID field is clear or has changed.

In some embodiments act 508 comprises, when the first value of the cache line is determined to have been previously captured by the trace, following a logged value logic path when influxing the cache line into the first cache level. In an example, cache influx logic 114 follows a logic path defined by the logged value logic 117 when influxing the cache line, and thus cache line is influxed to cache L2-A1 while refraining from logging a value of the cache line into an execution trace 111. Accordingly, in act 507, the logged value logic path stores the cache line into an entry within the first cache level without initiating logging of the first value of the cache line into the trace. Notably, it is possible that the logged value logic 117 stores some record of the influx, such as by storing a reference to a prior-logged value of the cache line (e.g., a prior logged influx by processing unit A2, for instance). Accordingly, in some embodiments of act 508, the logged value logic path stores the cache line into an entry within the first cache level while initiating logging, into the trace, a reference to the first value of the cache line previously captured by the trace.

Whether following the logged value logic 117 or the non-logged value logic 118, in embodiments the cache influx logic 114 may take appropriate action to indicate that the cache line has been logged, such as by appropriately setting tracking bits associated with an entry into which the cache line was stored, by influxing the cache line into a logged way, etc. Thus, in embodiments, influxing the cache line into the first cache level also includes, based at least on the first cache level being a recording cache level, at least one of storing the cache line within a logging way of the first cache level, or setting one or more tracking bits associated with an entry in the first cache level that stores the cache line to indicate that the cache line has been logged.

Regardless of whether method 500a influxed with non-recording logic in act 503 or influxed with recording logic in act 504, in embodiments method 500a comprises act 509, which proceeds to either act 501 (i.e., to process an influx of an additional cache line), or an act 510 of method 500b (i.e., to process an eviction of a cache line).

Figure 5B:
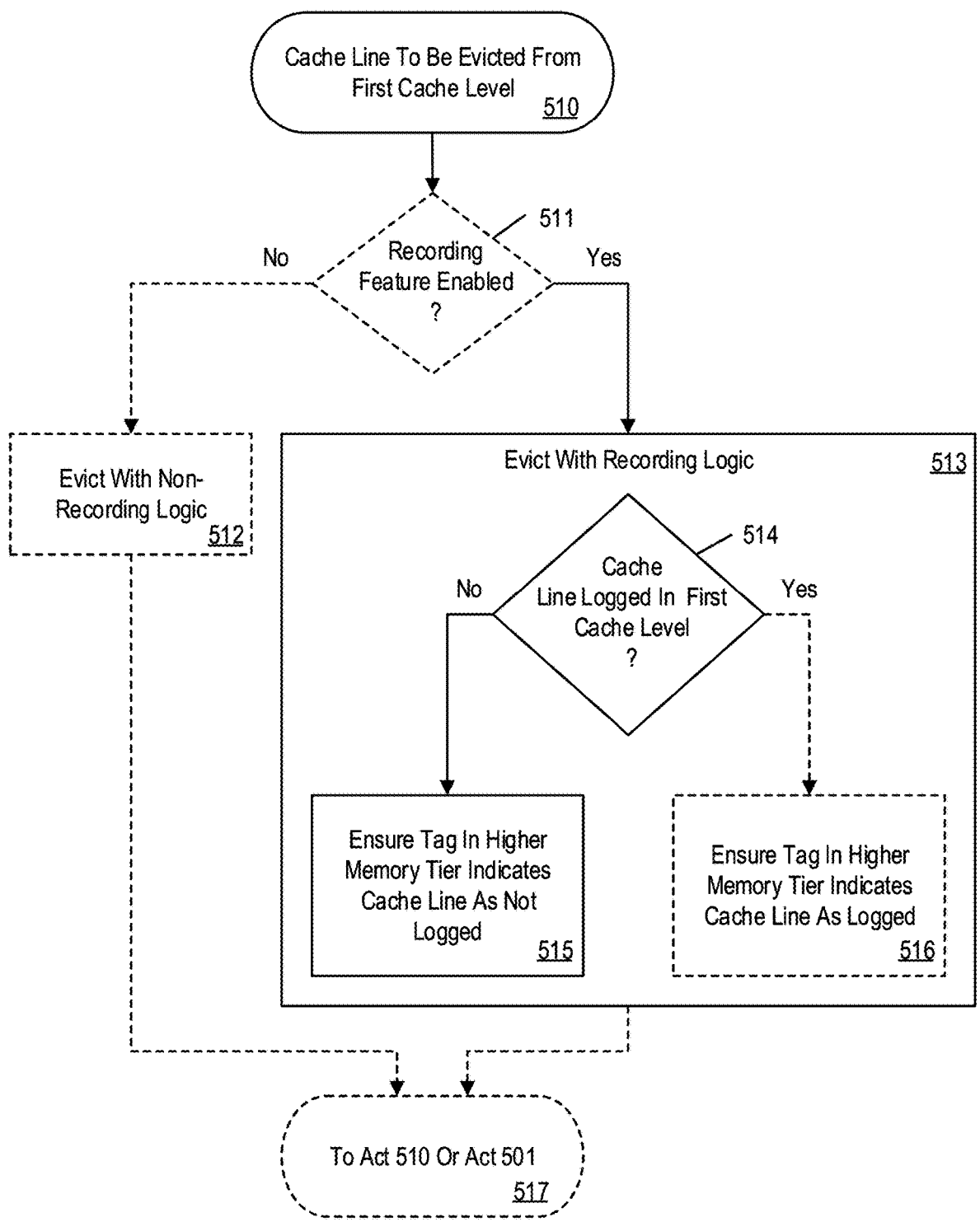
FIG. 5B illustrates a flow chart of an example method for setting tags in a higher memory tier during a cache line eviction.

Turning now to FIG. 5B, method 500b begins at act 510 where there is a cache line to be evicted from the first cache level. In some embodiments, act 510 comprises determining that a cache line in a first cache level is to be evicted. In an example, the control logic 108 determines that a cache line is evicted from cache L2-A1 into cache L3-A; in this example, the first cache level is an L2 cache, and the second cache level is an L3 cache. In another example, the control logic 108 determines that a cache line is evicted from cache L2-A1 into system memory 202 (e.g., where cache L3-A is not present).

As mentioned, some embodiments enable processor recording features to be enabled or disabled, such as globally, per-processing unit, per execution context, etc. In these embodiments, method 500b proceeds to an act 511 of determining if a recording feature is enabled. In an example, the cache influx logic 114 determines if trace recording is enabled or disabled, such as by checking a register value or some other toggleable value. When method 500*b* comprises act 511, it will be appreciated that the first cache level referred to in act 510 is a recording cache level only when a recording feature of the processor is enabled.

If method 500*b* comprises act 511, and if the recording feature is determined to not be enabled in act 511, then method 500*b* proceeds to an act 512 of evicting with non-recording logic (i.e., using non-recording eviction logic 124). Conversely, if method 500*b* comprises act 511, and if the recording feature is determined to be enabled in act 511, or if method 500*b* lacks act 511 (i.e., a recording feature is always active), then method 500*b* proceeds to an act 513 of evicting with recording logic (i.e., using recording eviction logic 121).

As shown, act 513 comprises an act 514 of determining if the cache line is logged in the first cache level. In some embodiments act 514 comprises, based at least on the first cache level being a recording cache level, determining whether a second value of the cache line within the first cache level has been captured by the trace. In an example, the logged determination component 122 determines if a current value of the cache line being evicted from cache L2-A1 has been captured by an execution trace 111, such as by checking logging status (e.g., logging bits, cache ways, etc.) to determine if the cache line was logged at influx, and by checking CCP data to determine if the cache line was modified while in cache L2-A1. If the cache line has been logged and its value has not changed, then the logged determination component 122 concludes that the current value of the cache line has been logged (i.e., "Yes" from act 514). Conversely, if the cache line has not been logged or its value has changed, then the logged determination component 122 concludes that the current value of the cache line has not been logged (i.e., "No" from act 514).

Depending on the determination of act 514, act 513 either proceeds to an act 515 of ensuring that a tag in the higher memory tier indicates the cache line as not logged (i.e., following the "No" path from act 514), or an act 516 of ensuring that the tag in the higher memory tier indicates that cache line as logged (i.e., following the "Yes" path from act 514).

In some embodiments act 515 comprises ensuring that the tag stored in the second cache level indicates that the cache line has not been logged. In an example, the tagging component 123 sets one or more fields within a tag in cache L3-A to indicate that the cache line has not been logged, such as by appropriately setting or clearing a "logged" flag, ensuring that an ASID field is clear or has changed, or ensuring that a VMID field is clear or has changed. In other embodiments act 515 comprises ensuring that the tag stored in the system memory indicates that the cache line has not been logged. In an example, the tagging component 123 sets one or more fields within a tag in system memory 202 to indicate that the cache line has not been logged, such as by appropriately setting or clearing a "logged" flag, ensuring that an ASID field is clear or has changed, or ensuring that a VMID field is clear or has changed.

In some embodiments act 516 comprises, based at least on the second value of the cache line having been captured by the trace, ensuring that the tag stored in the higher memory tier indicates that the cache line has been logged. In an example, the tagging component 123 sets one or more fields within a tag in cache L3-A, or in system memory 202, to indicate that the cache line has been logged, such as by appropriately setting or clearing a "logged" flag, setting an ASID field to an appropriate address space, or setting a VMID field to an appropriate virtual machine identifier. Thus, in embodiments, ensuring that the tag in the higher memory tier indicates that the cache line has been logged comprises at least one of setting a first field in the tag to indicate that the cache line has been logged, setting a second field in the tag to an address space identifier associated with the cache line, or setting a third field in the tag to virtual machine identifier associated with the cache line.

Notably, act 516 is shown in broken lines, indicating that, for a given cache line, the cache eviction logic 120 could choose not to set the tag in the higher memory tier to indicate that the cache line is logged—even when act 515 reaches a "Yes" determination. In these cases, the cache eviction logic 120 instead sets the tag indicate that the cache line has not been logged (i.e., act 515). It will be appreciated that, even though a cache line could be marked as logged, doing so is not necessary for correct logging (even though this could lead to increased trace size).

Regardless of whether method 500*b* evicted with non-recording logic in act 512, or evicted with recording logic in act 513, in embodiments method 500*b* comprises act 517, which proceeds to either act 510 (i.e., to process an eviction of another cache line), or act 501 of method 500*a* (i.e., to process an influx of a cache line).

As will be appreciated by one of ordinary skill in that art, methods 500*a*/500*b* interact for proper handling of a given cache line. For instance, if a particular cache line is being freshly imported from system memory 202, then when influxing the cache line to the first cache level method 500*a* would not find any indication in the higher memory tier that the cache line has been logged (act 506), and thus method 500*a* would influx the cache line using the non-logged logic (act 507) and log the cache line. However, if that cache line is later evicted from the first cache level and its value has been captured by an execution trace 111, then method 500*b* could ensure that a tag in the higher memory tier indicates the cache line as logged (act 516). Then, the next time the cache line is influxed to the first cache level without having been modified after a prior eviction from the first cache level, method 500*a* can influx the cache line using the logged logic (act 508) which avoids re-logging the cache line.

Thus, some embodiments comprise following the non-logged value logic path when influxing the cache line into the first cache level, and subsequently ensure that the tag stored in the higher memory tier indicates that the cache line has been logged when evicting the cache line from the first cache level (if its value has been captured by an execution trace 111). Additionally, some embodiments comprise ensuring that the tag stored in the higher memory tier indicates that the cache line has been logged when evicting the cache line from the first cache level, and subsequently following the logged value logic path when influxing the cache line into the first cache level.

Accordingly, at least some embodiments described herein perform cache-based trace logging using tags in a higher memory tier. These embodiments operate to log influxes to a first cache level, but leverage tags within a higher memory tier (e.g., an upper second cache level or system memory) to track whether a value of a given cache line influx has been previously captured. In particular, during an influx of a cache line to the first cache level, embodiments consult a tag in the higher memory tier to determine if a value of the cache line was previously captured. If so, embodiments refrain from re-logging the cache line. Additionally, during evictions from the first cache level, embodiments determine whether a value the cache line being evicted has been previously captured, and sets a tag in the higher memory tier as appropriate. Thus, the embodiments herein can leverage a potentially larger upper-level cache, or even system memory, to decrease trace size, while limiting implementation details and complication to a generally smaller lower cache level.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented by a processor, for cache-based trace logging using tags in an upper cache level, the method comprising:
    influxing a cache line into a first cache level from a second cache level arranged as an upper cache level to the first cache level, including, based at least on the first cache level being a recording cache level,
        reading a tag that is stored in the second cache level and that is associated with the cache line; and
        based at least on reading the tag, determining whether a first value of the cache line within the second cache level has been previously captured by a trace, and performing one of:
            when the first value of the cache line is determined to have been previously captured by the trace, following a logged value logic path when influxing the cache line into the first cache level; or
            when the first value of the cache line is determined to have not been previously captured by the trace, following a non-logged value logic path when influxing the cache line into the first cache level; and
    evicting the cache line from the first cache level, including determining whether a second value of the cache line within the first cache level has been captured by the trace, and based at least on the first cache level being a recording cache level, performing one of:
        based at least on the second value of the cache line having been captured by the trace, ensuring that the tag stored in the second cache level indicates that the cache line has been logged; or
        ensuring that the tag stored in the second cache level indicates that the cache line has not been logged.

2. The method of claim 1, wherein the logged value logic path stores the cache line into an entry within the first cache level without initiating logging of the first value of the cache line into the trace.

3. The method of claim 1, wherein the logged value logic path stores the cache line into an entry within the first cache level while initiating logging, into the trace, a reference to the first value of the cache line previously captured by the trace.

4. The method of claim 1, wherein the non-logged value logic path stores the cache line into an entry within the first cache level while initiating logging of the first value of the cache line into the trace.

5. The method of claim 1, wherein the non-logged value logic path ensures that the tag stored in the second cache level indicates that the cache line has been logged.

6. The method of claim 1, wherein influxing the cache line into the first cache level also includes, based at least on the first cache level being a recording cache level, at least one of:
    storing the cache line within a logging way of the first cache level; or
    setting one or more tracking bits associated with an entry in the first cache level that stores the cache line to indicate that the cache line has been logged.

7. The method of claim 7claim 1, wherein ensuring that the tag in the second cache level indicates that the cache line has been logged comprises at least one of:
    setting a first field in the tag to indicate that the cache line has been logged;
    setting a second field in the tag to an address space identifier associated with the cache line;
    setting a third field in the tag to virtual machine identifier associated with the cache line;
    setting a fourth field for storing an exception level;
    setting a fifth field for storing a ring; or
    setting a sixth field for storing a security state.

8. The method of claim 1, wherein the first value of the cache line is determined to have been previously captured by the trace when cache coherency protocol data indicates that the cache line has not been modified within the second cache level.

9. The method of claim 1, wherein the first value of the cache line is determined to have not been previously captured by the trace when cache coherency protocol data indicates that the cache line could have been modified within the second cache level.

10. The method of claim 1, wherein the method comprises,
    following the non-logged value logic path when influxing the cache line into the first cache level; and
    ensuring that the tag stored in the second cache level indicates that the cache line has been logged when evicting the cache line from the first cache level.

11. A processor for cache-based trace logging using tags in an upper cache level, comprising:
    a processing unit;
    a cache comprising a first cache level and a second cache level arranged as an upper cache level to the first cache level; and
    control logic that configures the processor to:
        influx a cache line into the first cache level from the second cache level, by at least, based at least on the first cache level being a recording cache level,
            reading a tag that is stored in the second cache level and that is associated with the cache line; and
            based at least on reading the tag, determining whether a first value of the cache line within the second cache level has been previously captured by a trace, and perform one of:
                when the first value of the cache line is determined to have been previously captured by the trace, following a logged value logic path when influxing the cache line into the first cache level; or when the first value of the cache line is determined to have not been previously captured by the trace, following a non-logged value logic path when influxing the cache line into the first cache level; and evict the cache line from the first cache level by at least,
determining whether a second value of the cache line within the first cache level has been captured by the trace; and
based at least on the first cache level being a recording cache level, performing one of:
based at least on the second value of the cache line having been captured by the trace, ensuring that the tag stored in the second cache level indicates that the cache line has been logged; or
ensuring that the tag stored in the second cache level indicates that the cache line has not been logged.

12. The processor of claim 11, wherein the logged value logic path stores the cache line into an entry within the first cache level without initiating logging of the first value of the cache line into the trace.

13. The processor of claim 11, wherein the logged value logic path stores the cache line into an entry within the first cache level while initiating logging, into the trace, a reference to the first value of the cache line previously captured by the trace.

14. The processor of claim 11, wherein the non-logged value logic path stores the cache line into an entry within the first cache level while initiating logging of the first value of the cache line into the trace.

15. The processor of claim 11, wherein the non-logged value logic path ensures that the tag stored in the second cache level indicates that the cache line has been logged.

16. The processor of claim 11, wherein influxing the cache line into the first cache level also includes, based at least on the first cache level being a recording cache level, at least one of:
storing the cache line within a logging way of the first cache level; or
setting one or more tracking bits associated with an entry in the first cache level that stores the cache line to indicate that the cache line has been logged.

17. The processor of claim 11, wherein,
the first value of the cache line is determined to have been previously captured by the trace when cache coherency protocol (CCP) data indicates that the cache line has not been modified within the second cache level; or
the first value of the cache line is determined to have not been previously captured by the trace when the CCP data indicates that the cache line could have been modified within the second cache level.

18. The processor of claim 11, wherein ensuring that the tag in the second cache level indicates that the cache line has been logged comprises at least one of:

setting a first field in the tag to indicate that the cache line has been logged;
setting a second field in the tag to an address space identifier associated with the cache line;
setting a third field in the tag to virtual machine identifier associated with the cache line;
setting a fourth field for storing an exception level;
setting a fifth field for storing a ring; or
setting a sixth field for storing a security state.

19. A hardware storage device that stores computer-executable instructions that are executable at a processor to cause the processor to at least:
influx a cache line into a first cache level from a second cache level arranged as an upper cache level to the first cache level, including, based at least on the first cache level being a recording cache level,
read a tag that is stored in the second cache level and that is associated with the cache line; and
based at least on reading the tag, determine whether a first value of the cache line within the second cache level has been previously captured by a trace, and perform one of:
when the first value of the cache line is determined to have been previously captured by the trace, following a logged value logic path when influxing the cache line into the first cache level; or
when the first value of the cache line is determined to have not been previously captured by the trace, following a non-logged value logic path when influxing the cache line into the first cache level; and
evict the cache line from the first cache level, including,
determine whether a second value of the cache line within the first cache level has been captured by the trace; and
based at least on the first cache level being a recording cache level, perform one of:
based at least on the second value of the cache line having been captured by the trace, ensuring that the tag stored in the second cache level indicates that the cache line has been logged; or
ensuring that the tag stored in the second cache level indicates that the cache line has not been logged.

20. The hardware storage device of claim 19, wherein ensuring that the tag in the second cache level indicates that the cache line has been logged comprises at least one of:
setting a first field in the tag to indicate that the cache line has been logged;
setting a second field in the tag to an address space identifier associated with the cache line;
setting a third field in the tag to virtual machine identifier associated with the cache line;
setting a fourth field for storing an exception level;
setting a fifth field for storing a ring; or
setting a sixth field for storing a security state.

* * * * *